P. S. RAKOWSKI.
EGG TESTER AND HANDLER.
APPLICATION FILED NOV. 24, 1916.
1,242,979.
Patented Oct. 16, 1917.
3 SHEETS—SHEET 3.
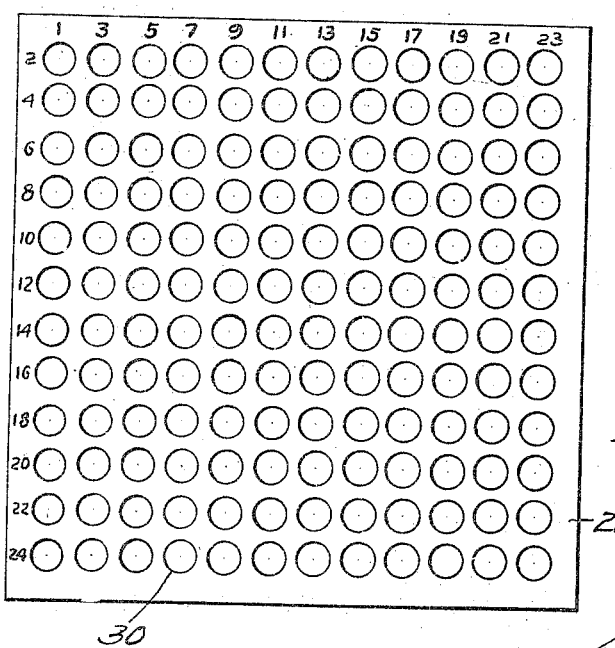
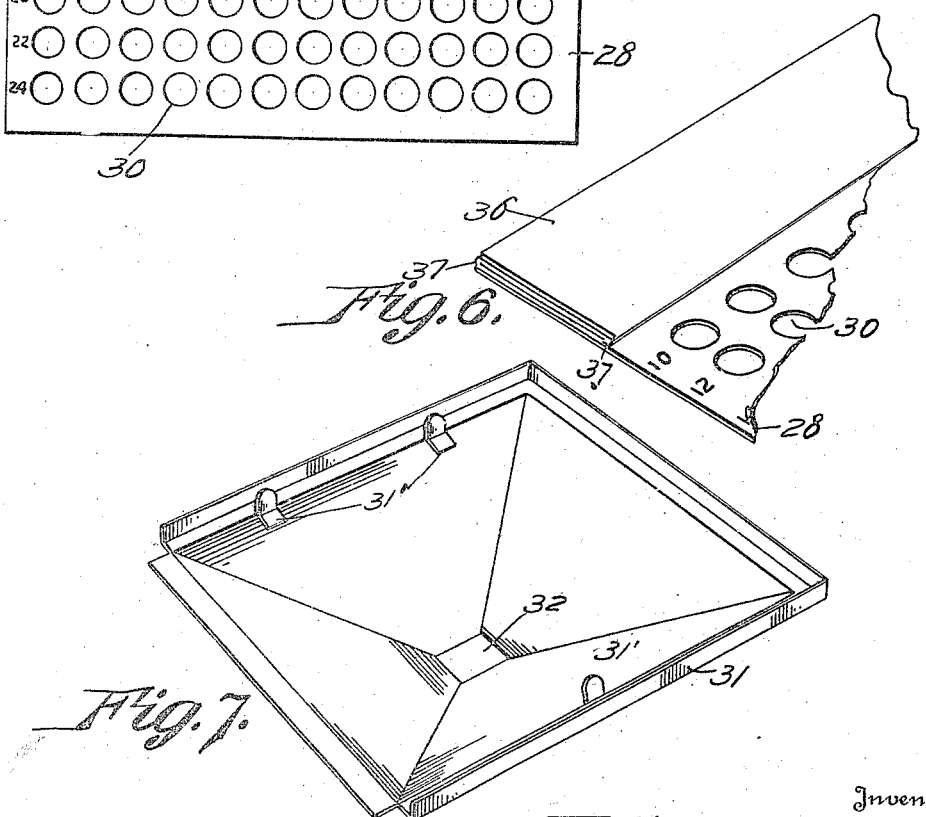
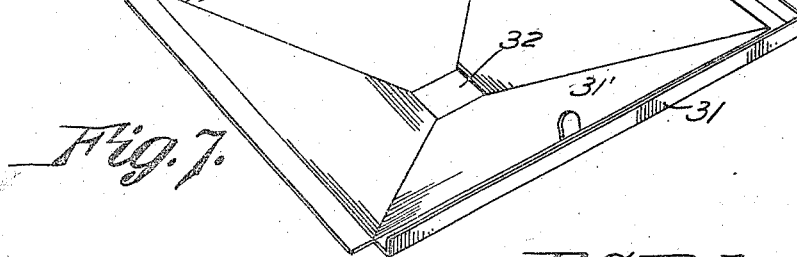
Inventor
P. S. Rakowski,
By John Louis Waters
Attorney

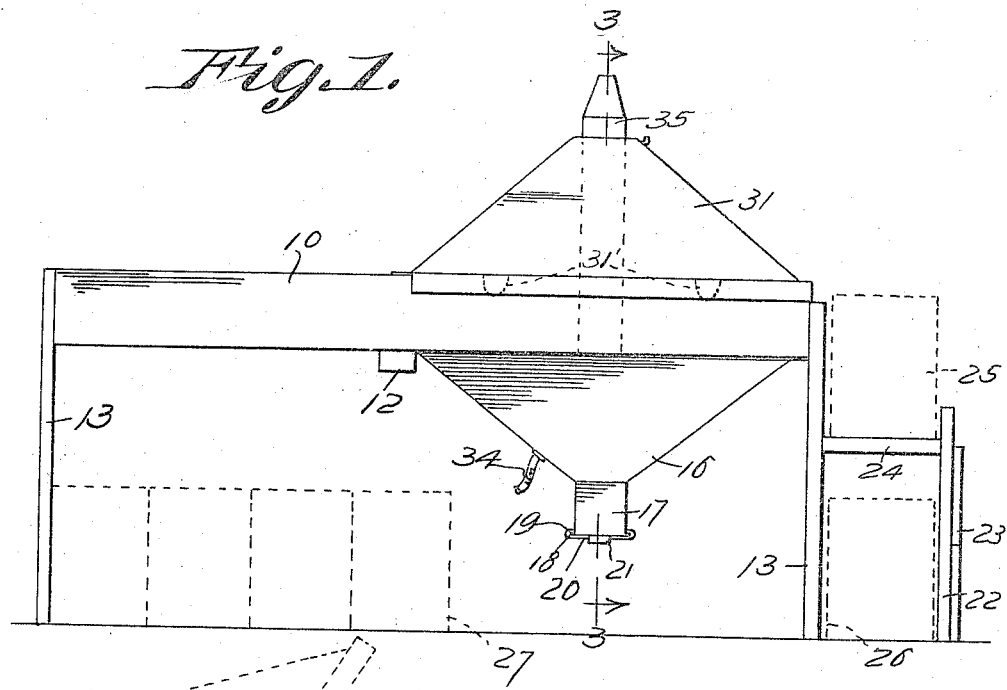
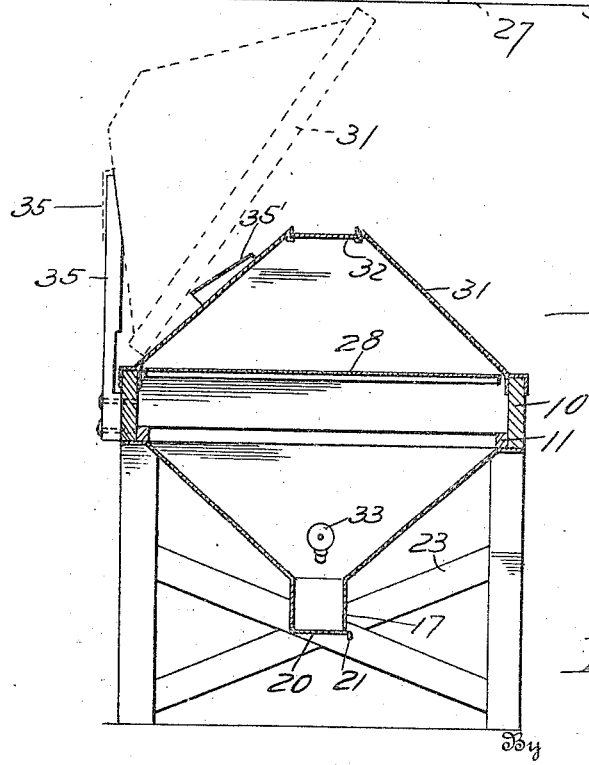

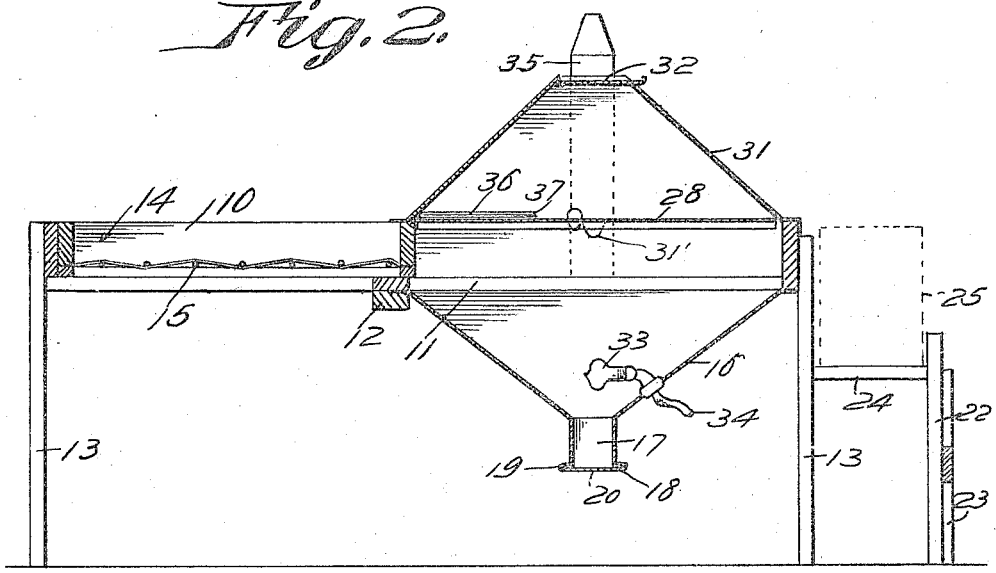
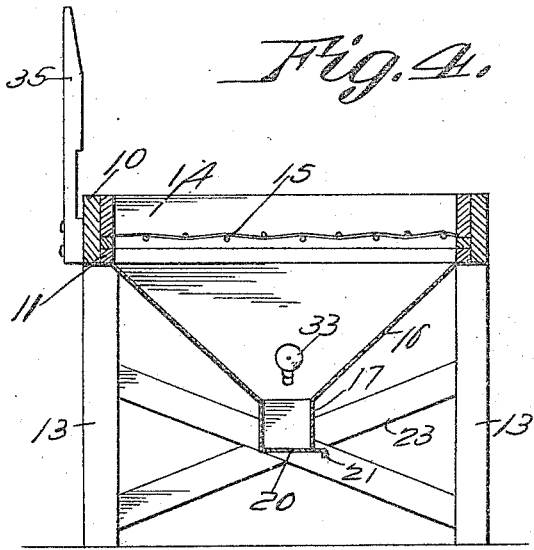

UNITED STATES PATENT OFFICE.

PETER S. RAKOWSKI, OF DICKINSON, NORTH DAKOTA.

EGG TESTER AND HANDLER.

1,242,979.  Specification of Letters Patent.  Patented Oct. 16, 1917.

Application filed November 24, 1916. Serial No. 133,233.

*To all whom it may concern:*

Be it known that I, PETER S. RAKOWSKI, a citizen of the United States, residing at Dickinson, in the county of Stark and State of North Dakota, have invented certain useful Improvements in Egg Testers and Handlers, of which the following is a specification, reference being had therein to the accompanying drawing.

The present invention relates to a device for handling and testing eggs, and has for an object to provide a relatively small and compact device by means of which eggs may be transferred from pails, boxes and the like, in which the eggs are generally packed, with saw dust, oats, or other soft material, into egg crates for shipping and for delivery to the retail trade.

It is another object of this invention to provide a device of this character which supports the eggs and the crate into which the eggs are to be packed at a height, which permits of the person handling the egg to stand upright, and prevent stooping or walking in the operation.

The invention further aims at the provision of an improved device of this character which has novel means for testing practically any number of eggs at one time, and means for indicating the unsalable eggs, so that the same may be readily picked out after the eggs have been tested.

The above, and other objects of this invention will be more specifically brought out in the following detailed description of the present preferred embodiment, the same being illustrated in the accompanying drawings, wherein—

Figure 1 is a side elevation of an egg tester and handler, constructed according to the present invention.

Fig. 2 is a longitudinal section taken through the same.

Fig. 3 is a transverse section taken on the line 3—3 of Fig. 1, showing the device adjusted in position for testing the eggs.

Fig. 4 is a similar view showing the device adjusted for separating the eggs from the packing material.

Fig. 5 is a detailed plan view of the egg testing plate.

Fig. 6 is a similar view showing an adjustable cover applied to the plate.

Fig. 7 is a detail view of the adjustable cover for application to the egg testing plate.

Referring to these drawings, wherein like parts are designated by similar characters of reference throughout the several views, 10 designates a rectangular elongated frame, provided at its lower edge and at its inner sides with longitudinally extending guide strips 11, and having intermediate its ends a transverse brace bar 12, secured across the lower edge of the frame. The frame 10 may be supported in any suitable manner, as by standards 13, at a height to admit easy access to the interior of the frame without stooping.

Fitting in the frame 10 on the guide strip 11 is a shiftable tray 14, the same being of a length equal substantially to one half the length of the frame 10, and being adapted in the use of the device to be slid from end to end within the frame. This tray 14 is provided with an open mesh bottom 15, the bottom being preferably formed from lengths of crossed wire of substantial thickness, and being of such size as to support eggs within the tray and permit of the passage of saw dust, oats, or other relatively thin packing material to pass down through the tray.

Beneath the right hand end of the frame 10 is suspended a hopper 16, the latter being provided at its reduced lower end with a depending neck 17 having out-turned lateral flanges 18 at its lower edge for engagement beneath the over-turned flanges 19 formed upon the opposite lateral edges of a gate or closure 20. The closure 20 is in the form of a plate of such size as to close the lower end of the neck 17, and has a down-turned lip 21 on its forward edge for engagement by the hand to slide the gate into open or closed positions.

The device is provided at preferably its right hand end, adjacent to the hopper 16, with a rack formed of up-rights 22, spaced outwardly from the adjacent standards 13 and being reinforced by preferably crossed braces 23. Supporting bars 24 extend horizontally from the standards 13 to the up-rights 22 and are adapted to support an egg case, as shown at 25 in dotted lines, at a height to dispose the upper edge thereof substantially in the horizontal plane of the upper edge of the frame 10.

The space beneath the bars 24 is adapted to be such as to accommodate a second egg case, indicated at 26. The frame 10 is of such height as to permit of the positioning of a number of egg cases 27 beneath the left hand end of the frame, as shown in the drawings.

The means for testing the eggs comprises a testing plate 28, adapted to be placed across the frame 10 immediately over the hopper 16 when the tray 14 is shifted. The testing plate 28 is made preferably from heavy sheet metal and is provided with a plurality of openings 30, of a size adapted each to receive one egg, and to suspend the egg in the opening. The upper side of the plate is provided along one lateral edge, and along one longitudinal edge with a row of numbers, and suitable indicia arranged opposite to the rows of openings which are formed in the plate 28, and by means of which certain of the openings 30 may be quickly identified.

An upwardly tapering hood 31 is adapted to be swung downwardly over the testing plate 28 to inclose the same. The top of the hood 31 is provided with a side opening 32 through which eggs placed on the plate 28 may be viewed.

The hopper 16 is provided in its interior with a source of light 33, the same being disclosed in the present instance as in the form of an electric light bulb, the wires 34 of which may be carried outwardly through one side of the hopper 16. This light 33 may be permanently mounted in the hopper 16 as shown, as the light packing material adapted to be passed downwardly through the hopper 16 will not injure the light. A suitable support 35 extends upwardly from the rear side of the frame 10 for supporting the hood 31 and the testing plate 28 when the latter are swung back out of the way when not in use.

It will be noted that the testing plate 28 is provided with several rows of openings 30, corresponding to the approximate number of eggs to be tested at one time. Should however it be desired to test a smaller number of eggs, a covering member is adapted to be placed over the plate 28, and to be completely folded if it is desired to block out but one row of the openings, and to be opened to extend one or more of the panels over the surface of the plate, according to the number of rows of openings to be covered. Each panel of the covering member is equal substantially in width to the width of the corresponding rows of openings.

It will be noted that the up-rights 22 of the rack project a short distance above the supporting bars 24 for the purpose of preventing the accidental slipping of the egg case 25 from the top of the rack.

In the use of the device, the eggs are brought in the usual manner packed in containers with saw dust, oats, straw, or other light relatively thin packing material. The tray 14 is moved into position over the hopper 16, and the containers, partially covered by cloth or the like, are dumped into the tray. The packing material passes down through the open mesh bottom 15 of the tray into the hopper 16, and may be collected again into containers upon the opening of the gate 20 when the containers are placed beneath the neck 17. The tray 14 containing the eggs is now shifted to the opposite end of the frame 10, and the testing plate 28 is swung down into position over the hopper 16. The eggs are now placed upon the plate 28, one in each opening 30. The hood 31 is now swung downwardly over the plate 28 and the observer now places his eye to the sight opening 31 and looks downwardly through the eggs on the plate 28. The luminous element 33 shines upwardly through the hopper 16, and through the eggs on the plate 28. By the provision of the indicia along the edges of the plate 28, the opaque eggs, if any, may be quickly placed, and their positions noted. After this has been done, the hood 31 is raised and the unsalable eggs removed from the plate 28. The remaining eggs may be transferred from the plate to the egg case 25 which is supported on the rack in close proximity to the tester.

To facilitate the testing of the eggs, it is preferable to provide the interior of the hopper 16 with a coat of white paint, and to similarly coat the lower side of the plate 28. The hood 31, however is preferably coated or lined with a black substance, as is also the top of the plate 28.

The frame, rack, their supports, and the tray may be made from light wood, and comprises but relatively few parts, easily assembled. The hopper, hood, and other parts of the device, may be made from sheet metal which is capable of being stamped and bent economically to provide these parts. It is of course understood that various changes and modifications may be made in the above specifically described structure without departing from the spirit of this invention, to adapt the device for handling large or small quantities of eggs, and for various conditions met with in its manufacture and installation.

What is claimed is:

1. In a combined egg tester and handler, a frame, a hopper arranged beneath one end of the frame, a tray slidably mounted in the frame and adapted for adjustment over the hopper and provided with an open mesh bottom, said tray being adapted to receive packed eggs therein and to separate the packing from the eggs, a source of light arranged in the hopper, a testing plate adapted for engagement over the frame upon the shifting of said tray into the opposite end thereof, said plate having openings therein to receive eggs from the tray, and a hood adapted to fit over said plate and having a sight opening in the upper end thereof through which the eggs may be observed.

2. A combined egg tester and handler comprising a frame, a tray mounted to slide in the frame, a hopper arranged beneath one end of the frame, a gate closing the lower end of the hopper, said tray being adapted to receive eggs therein and provided with an open mesh bottom through which the packing is adapted to pass into the hopper, a testing plate carried by the frame for engagement over said hopper upon the shifting of the tray into the opposite end thereof, said plate provided with openings therein to receive eggs from the tray, and a hopper carried by the frame for engagement over the plate and provided with a sight opening therein through which the eggs may be observed.

In testimony whereof I affix my signature.

PETER S. RAKOWSKI.